United States Patent [19]

Kuhns

[11] Patent Number: 5,042,831
[45] Date of Patent: Aug. 27, 1991

[54] ADJUSTABLE LENGTH VEHICLE CHASSIS

[75] Inventor: Abe B. Kuhns, Arthur, Ill.

[73] Assignee: E-Z Trail, Inc., Arthur, Ill.

[21] Appl. No.: 500,753

[22] Filed: Mar. 28, 1990

[51] Int. Cl.⁵ .............................................. B62B 1/00
[52] U.S. Cl. .................................. 280/656; 280/404; 280/786
[58] Field of Search ............... 280/781, 786, 656, 789, 280/404

[56] References Cited

U.S. PATENT DOCUMENTS 4,397,476 8/1983 Bolyard et al. ..................... 280/656
4,561,671 12/1983 DeWitt et al. ...................... 280/404

FOREIGN PATENT DOCUMENTS 1214096 4/1966 Fed. Rep. of Germany ...... 280/656
875158 9/1942 France ................................ 280/786
723732 2/1955 United Kingdom ............... 280/656

OTHER PUBLICATIONS

Meyers Mfg. Corp., *Meyers New Farm Wagon;* updated; 2 pages.
Gruett's *Wagon Gears;* undated; 1 page.
John Deere, *Forage Equipment,* 2-88; cover page, pp. 28-29, and back cover.

*Primary Examiner*—Kenneth R. Rice
*Attorney, Agent, or Firm*—Lockwood, Alex, FitzGibbon & Cummings

[57] ABSTRACT

The present invention relates to an adjustable length vehicle chassis having front and rear reach beams and a center beam, and in which the center beam is telescopically slidable into the reach beams and one reach beam is telescopically slidable into the other reach beam to attain minimum length adjustments of the chassis. One of the reach beams also includes a longitudinal slot extending substantially over its length to permit fractional length adjustments over a wide variety of lengths between maximum and minimum chassis lengths.

27 Claims, 2 Drawing Sheets

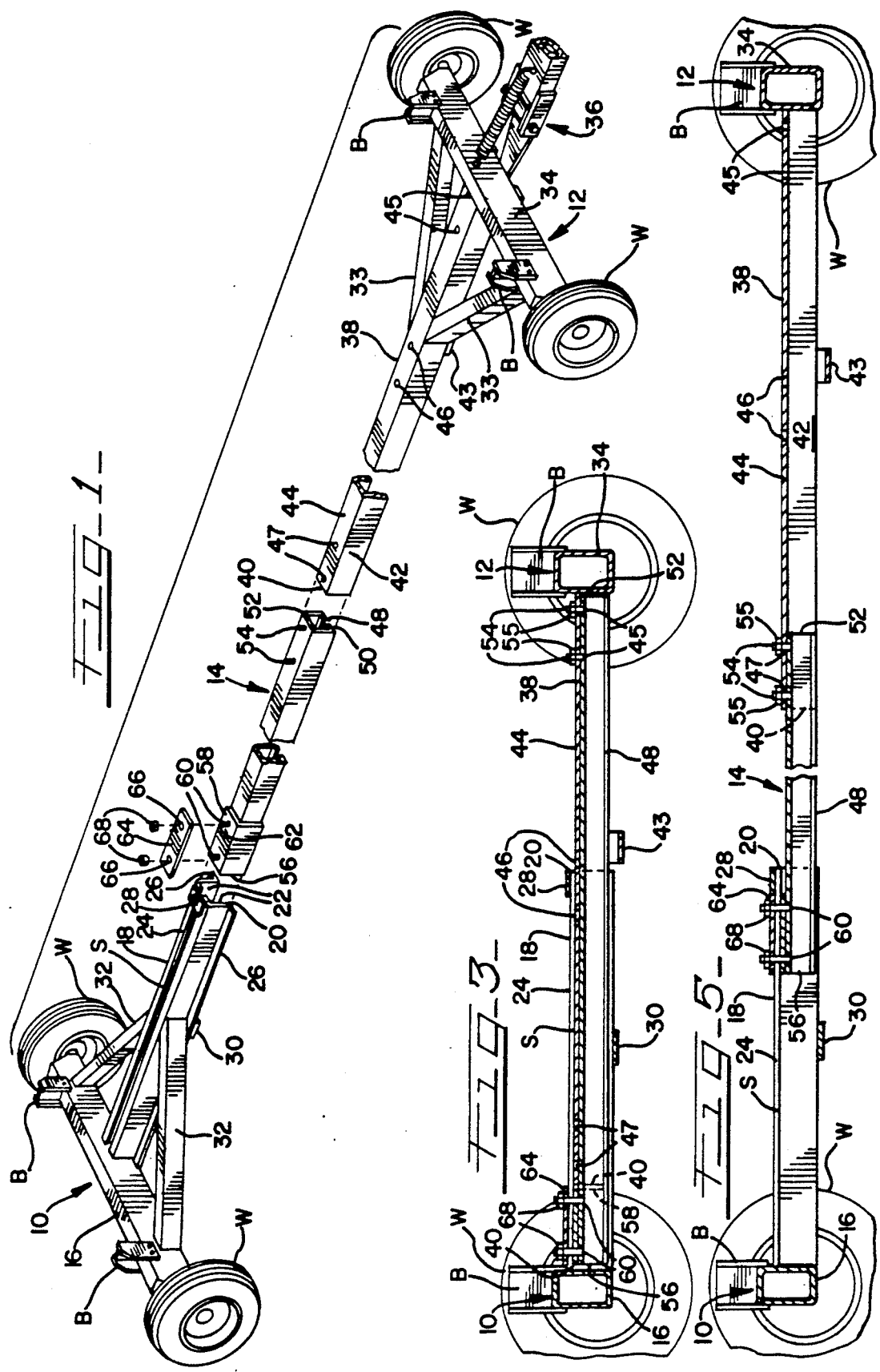

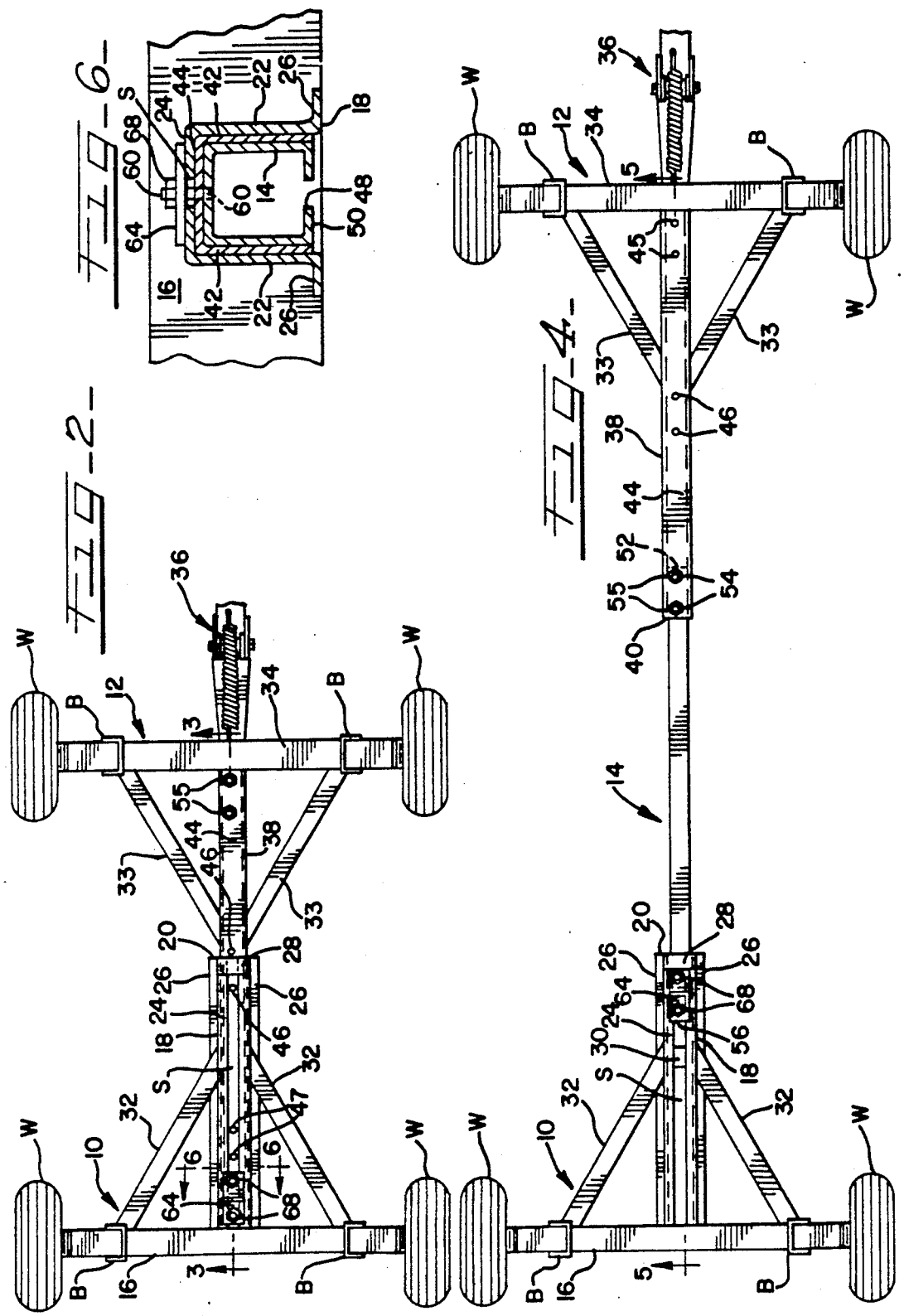

ADJUSTABLE LENGTH VEHICLE CHASSIS

BACKGROUND AND SUMMARY OF THE INVENTION

The present invention is directed to a vehicle chassis and, more particularly, to a wagon chassis which is capable of being adjusted to a variety of lengths between maximum and minimum.

Chassis are known in the art which generally include cylindrical pipes which are capable of longitudinal adjustment relative to each other to permit adjustment of the chassis length. The pipes have holes positioned at intervals along their length to permit the pipes to be locked in selected adjustment positions. These prior adjustable length chassis typically include front and rear axle assemblies each of which includes an axle beam extending transversely of the chassis on which the vehicle wheels are mounted, and a cylindrical pipe reach beam on each of the axle beams extending forward of the rear axle beam and rearward from the front axle beam. A cylindrical center pipe is slidably received into the respective cylindrical reach beams to permit longitudinal adjustment of the chassis length.

These prior adjustable length chassis suffer several disadvantages. One disadvantage is that the number of length adjustments is limited to the number of adjustment holes provided and the positioning of those holes. Thus, exact fractional adjustment is not possible. Another disadvantage is that the minimum length of adjustment of the chassis is limited to the total combined length of the reach beam pipes which are typically of identical diameter. When these prior chassis are adjusted to their minimum length, that length is reached when the ends of the reach beams abut each other. Thus, not only is adjustment to minimum length limited, but the total range of adjustment between the maximum and minimum lengths is also limited.

The adjustable length vehicle chassis of the present invention overcomes these several disadvantages. In the chassis of the present invention length adjustment may be accomplished over an essentially infinite number of adjustment lengths without restriction to only a few selected lengths, and the adjustment may be to a fraction of an inch. The chassis of the present invention is also capable of adjustment to a maximum length which is substantially greater than the maximum lengths possible in the prior known adjustable chassis. Moreover, the total range of adjustment between the maximum and minimum lengths in the chassis of the present invention is substantially greater than the ranges attained by the prior adjustable chassis. In addition to the foregoing advantages, the adjustable length vehicle chassis of the present invention permits torsional twisting which is desirable where the chassis is to operate on uneven terrain.

In one principal aspect of the present invention, a vehicle chassis which is adjustable between maximum and minimum lengths includes first and second axle assemblies each having first and second axle beams, respectively, extending transversely of the chassis and adapted to have wheels mounted thereon. First and second reach beams are mounted on the first and second axle beams, respectively, and extend longitudinally from and substantially perpendicular to the respective axle beams and toward each other. Each of the reach beams terminate in distal ends opposite their respective axle beams. A center beam is also provided having opposite distal ends. The first and second reach beams and the center beam are dimensioned relative to each other to telescopically interfit with each other such that the distal ends of the center beam are positioned adjacent the first and second axle beams and the distal end of at least one of the reach beams is positioned adjacent to the axle beam of the other reach beam when the chassis is at its minimum length. Locking means locks the beams relative to each other when the chassis is at its minimum length.

In still another principal aspect of the present invention, when the aforementioned chassis is at its minimum length, the center beam is positioned within both of the reach beams and one of the reach beams is positioned in the other reach beam.

In still another principal aspect of the present invention, the aforementioned first reach beam comprises side walls spaced from each other by a top wall, and the top wall comprises a slot extending over a substantial part of its longitudinal length to permit fractional adjustment of the length of the chassis.

In still another principal aspect of the present invention, the aforementioned first reach beam is a hat channel in cross section, the second reach beam is a U-shaped channel in cross section and the center beam is a box channel in cross section having a slot in one side thereof.

In still another principal aspect of the present invention, the aforementioned locking means includes a plate overlying the aforementioned slot, and vertically extending first fastener means mounted adjacent one distal end of the center beam and extending upwardly through the slot and plate and removably fastened to the plate.

In still another principal aspect of the present invention, the aforementioned fastening means also includes vertically extending second fastener means mounted adjacent the other distal end of the center beam, and openings in the second reach beam at least adjacent the second axle beam. The second fastener means extends upwardly through the openings and are removably fastened to the second reach beam.

In still another principal aspect of the present invention, the aforementioned second reach beam also includes at least one opening adjacent its distal end and the second fastener means extends upwardly through the last mentioned opening and are removably fastened to the second reach beam when the chassis is at its maximum length These and other objects, features and advantages of the present invention will be more clearly understood upon consideration of the detailed description of the preferred embodiment of the invention which will be described to follow.

BRIEF DESCRIPTION OF THE DRAWINGS

In the course of this description, reference will frequently be made to the attached drawings in which:

FIG. 1 is a partially broken, exploded perspective view of a preferred embodiment of adjustable length vehicle chassis constructed in accordance with the principles of the present invention;

FIG. 2 is a plan view of the vehicle chassis shown in FIG. 1, which has been adjusted to its minimum length;

FIG. 3 is a cross sectioned, side elevation view of the chassis adjusted to its minimum length, as viewed substantially along line 3—3 of FIG. 2;

FIG. 4 is a plan view of the vehicle chassis shown in FIG. 1, which has been adjusted to its maximum length;

FIG. 5 is a cross sectioned, side elevation view of the chassis adjusted to its maximum length, as viewed substantially along line 5—5 of FIG. 4; and FIG. 6 is a cross sectioned, end elevation view showing the interfitted positioning of the reach beams and center beam of the vehicle chassis of the preferred embodiment of the present invention in their minimum length adjustment position as viewed substantially along line 6—6 of FIG. 2.

DESCRIPTION OF THE PREFERRED EMBODIMENT

A preferred embodiment of adjustable length vehicle chassis constructed in accordance with the principles of the present invention is shown in FIG. 1. The chassis essentially comprises three primary elements: a rear axle assembly 10, a front axle assembly 12 and a center beam 14.

The rear axle assembly 10 comprises a rear axle beam 16 which extends transversely of the chassis and includes suitable mountings at its ends for mounting wheels W for rotatably supporting the chassis for transport. The rear axle beam 16 also preferably includes brackets B or other suitable structure thereon for supporting the load or object to be transported by the chassis.

The rear axle assembly 10 also includes a rear reach beam 18 which extends longitudinally forward of the rear axle beam 16 and perpendicular thereto. One end of the rear reach beam 18 is rigidly mounted to the rear axle beam 16, such as by welding, and the other end of the rear reach beam terminates in a forwardly located distal end 20. The rear reach beam 18 is preferably formed of a hat channel having a pair of spaced side walls 22, a top wall 24 and a pair of outwardly extending bottom flanges 26, as best seen in FIGS. 1 and 6. Alternatively the rear reach beam 18 may be U-shaped in cross section with the flanges 26 omitted. A slot S extends longitudinally over substantially the entire length of the top wall 24 of the reach beam 18 to permit incremental fractional adjustment of the length of the chassis, as will be more fully described to follow.

A tie plate 28 is also preferably provided at the distal end 20 of the rear reach beam 18. The tie plate 28 extends across the slot S and is rigidly attached to the top wall 24, as by welding, to rigidify the distal end of the rear reach beam 18. Another tie plate 30 is also preferably provided intermediate the length of the rear reach beam 18 which spans the underside of the reach beam and is rigidly attached, such as by welding, to the underside of the flanges 26. The tie plate 30 both further rigidifies the rear reach beam as well as acts as a support for slidably supporting the center beam 14 during adjustment of the chassis length. Diagonal trusses 32 also preferably extend between the rear axle beam 16 and the rear reach beam 18 intermediate its length to further rigidify the rear axle assembly 10.

The front axle assembly 12 also includes a front axle beam 34 which extends transversely of the chassis, and which includes suitable mountings at its ends for mounting wheels W for rollably supporting the front axle assembly for transport. A draw bar 36 is preferably pivotally and swivelably mounted to the front of the front axle beam 34. The draw bar 36 will not be described in detail as it is conventional and does not form a substantial part of the invention. The front axle beam 34 also preferably includes brackets B as previously described.

The front axle assembly 12 also includes a front reach beam 38 which is rigidly attached at one end, such as by welding, to the front axle beam 34. The front reach beam 38 extends longitudinally rearward of the chassis preferably for a length greater than the length of the rear reach beam 18 and terminates in a distal end 40. The front reach beam 38 preferably comprises a channel which is U-shaped and open at its bottom comprising side walls 42 and a top wall 44. The internal cross sectional dimensions and shape of the front reach beam 38 are similar to the external cross sectional dimensions and shape of the center beam 14 so as to slidingly and telescopically receive the center beam 14 therein. The external cross sectional dimensions and shape of the front reach beam 38 are similar to the internal cross sectional dimensions and shape of the rear reach beam 18 so as to be slidingly and telescopically received in the rear reach beam 18.

A support bracket 43 is preferably provided beneath the front reach beam 38 intermediate its length to slidingly support the center beam 14 during adjustment and to rigidify the front reach beam 38. The top wall 44 of the channel of the front reach beam 38 includes several sets of adjustment openings or holes 45, 46, 47 spaced along its length. The adjustment holes 45 permit locking of the chassis in its minimum length adjustment, holes 46 in an intermediate length adjustment, and holes 47 in its maximum length adjustment. Diagonal trusses 33 are also preferably provided which extend between the front axle beam 34 and the front reach beam 38 to further rigidify the front axle assembly 12.

The center beam 14 comprises an elongate box channel preferably having a slot 48, as best seen in FIGS. 1 and 6, extending the length of the channel bottom wall 50 to enhance the ability of the chassis to twist when it is operating on an uneven terrain. One distal end 52 of the center beam 14 is adapted to enter the distal end 40 of the front reach beam 38 and a pair of fasteners, such as upwardly extending bolts 54, are mounted adjacent the distal end 52 in spaced relationship to each other and identical to the spacing of the adjustment holes 45, 46, 47 in the front reach beam 38. When the chassis is in use, the bolts 54 are positioned to extend upwardly through one of the sets of holes 45, 46, 47 in the front reach beam 38, and the center beam 14 is locked to that reach beam by nuts 55 as shown in FIGS. 2-5.

The other distal end 56 of the center beam 14 preferably includes a short piece of U-shaped channel 58, as best seen in FIG. 1, to enlarge the outer dimension of the center beam 14 so that it substantially coincides with the inner dimension of the rear reach beam 18 to be slidingly received therein. The channel piece 58 is preferably of the same cross sectional dimension and shape as the channel which forms the front reach beam 38, and may be a formed of a short length of the same channel material.

A pair of fasteners, such as bolts 60 are mounted to the top wall 62 of the channel piece 58 and extend upwardly through the slot S of the rear reach beam 18. A locking plate 64 having holes 66 to receive the bolts 60 is positioned in overlying relationship to the top wall 24 of the rear reach beam 18, and nuts 68 lock the plate 64 and the distal end 56 of the center beam 14 in the reach beam 18 at any fractional position desired along the length of the slot S.

Although it is believed from the foregoing description of the preferred embodiment of the invention that adjustment of the length of the vehicle chassis to its maximum or minimum lengths, as well as numerous fractional intermediate lengths therebetween, will be clear, a brief description of the length adjustment follows.

DESCRIPTION OF ADJUSTMENT

To adjust the chassis length to the minimum length as shown in FIGS. 2 and 3, the forward distal end 52 of the center beam 14 is inserted into the distal end 40 of the front reach beam 38, and the center beam is slid into the front reach beam 38 until its distal end 52 contacts the front axle beam 34. As viewed in FIG. 3, the distal end 52 of the center beam 14 is shown slightly spaced from the front axle beam 34 for purposes of description and illustration only, it being understood that the distal end in the minimum length adjustment condition preferably actually contacts the front axle beam 34 in order to fully minimize the length of the chassis to the greatest possible extent.

As previously mentioned, the external dimensions of the center beam 14 are slightly smaller than the internal dimensions of the front reach beam 38 to permit the telescopic movement of the center beam 14 into that reach beam. This sliding insertion of the center beam 14 into the front reach beam 38 is assisted by the bracket 43 which is suspended somewhat below the bottom of the front reach beam channel to support the center beam while it is telescopically slid into the front reach beam 38, and so as to permit the fastener bolts 54 to clear the underside of the top wall 44 of the front reach beam 38. Once the center beam 14 has been positioned with its distal end 52 against the front axle beam 34, the center beam and its fastener bolts 54 are lifted upwardly so that the bolts extend through the adjustment holes 45, and the center beam is locked as so placed in the front reach beam by the nuts 55.

When the center beam 14 has been fully telescopically extended into the front reach beam 38, the distal end 40 of the front reach beam 38 will preferably come to rest against the forward end of the channel piece 58 on the center beam 14, although these elements have been shown as slightly spaced apart in FIG. 3 again for purposes of illustration. The rear distal end 56 of the center beam and its channel piece 58 are inserted into the distal end 20 of the rear reach beam 18 and are moved down the length of the rear reach beam until the distal end 56 of the center beam 14 contacts the transverse rear axle beam 16. Again, in FIG. 3 the distal end 56 of the center beam 14 is shown slightly spaced from the rear axle beam 10 principally for purposes of illustration, it being understood that in practice it is preferred that the distal end 56 contact the rear axle beam in order to attain an adjustment of an absolute minimum length. It will also be seen that the external dimensions of the front reach beam 38 and the channel piece 58 of the center beam 14 are similar to the internal dimensions of the rear reach beam 18 to facilitate the sliding telescopic positioning of the center beam 14 and front reach beam 38 in the rear reach beam 18 as just described. The tie plate 30 also assists this sliding adjustment by supporting the beams during their sliding telescopic insertion into the rear reach beam 18. It will also be seen that although the length of the front reach beam 38 is greater than the length of the rear reach beam 18, there is no loss of minimum length because the front reach beam is telescopically received into the rear reach beam.

During insertion of the center beam 14 and its channel piece 58 into the rear reach beam 18, as well as when the distal end 56 of the center beam 14 has been brought to bear against the rear axle beam 16, the fastener bolts 60 will extend upwardly through the slot S in the rear reach beam 18. In order to lock these beams in place in the desired position, the locking plate 64 is inserted over the upwardly exposed bolts 60, and the nuts 68 are tightened to clamp the top wall 62 of the channel piece 58 to the underside of the top wall 24 of the rear reach beam 18 and the locking plate 64 to the top of the top wall 24.

Although adjustment to the chassis minimum length has been described above in the order of first inserting the center beam 14 into the front reach beam 38 and then both beams into the rear reach beam 18, it will be understood that this order may be reversed without departing from the principles of the invention.

If it is now desired to adjust the chassis length from the minimum to its maximum length, all that need be done is to loosen the nuts 55 and 68. Once those nuts are loosened, the front reach beam 38 and the center beam 14 may be pulled forward along the slot S in the rear reach beam 18 until the front of the locking plate 64 comes to bear against the tie plate 28 at the front distal end 20 of the rear reach beam 18. At this position, the nuts 68 are again tightened to lock the center beam 14 in place, as shown in FIGS. 4 and 5.

The front reach beam 38 is continued to be slidably and telescopically moved forward and along the just locked center beam 14 until the fastener bolts 54 of the center beam 14 are positioned beneath the adjustment holes 47 on the front reach beam 38. When so positioned, the fastener bolts 54 are lifted upwardly through the adjustment holes 47 and the nuts 55 are again locked in place to achieve the maximum chassis length.

It will be seen that because the front reach beam 38 is longer than the rear reach beam 18, that the maximum length of the vehicle is maximized. This is without sacrificing the minimum length because at the minimum length the front reach beam is telescopically received into the rear reach beam as previously discussed.

It also will be appreciated from the foregoing description of adjustment that a number of other length adjustments intermediate the maximum and minimum lengths as just described are possible in the chassis of the present invention. For example, other length adjustments may be attained by locking of the fastener bolts 54 in either of the adjustment hole sets 45, 46 or 47, while locking the fastener bolts 60 on the center beam 14 in any position along the length of the rear reach beam slot S. Moreover, it will be appreciated that by provision of the slot S in the preferred embodiment of the present invention, any number of incremental fractional length adjustments may be easily and rapidly achieved.

By way of example and not to be considered as limiting the invention, it has been found that a minimum length of about 84 inches and a maximum length of about 15 feet 6 inches may be realized where the fore and aft width of the rear axle beam 16 and front axle beam 34 is 4 inches, the center beam 14 has a length of 80 inches and its channel piece 58 has a length of 10 inches, the rear reach beam 18 has a length of 49 inches and the front reach beam has a length of 70 inches.

It will also be appreciated that because each of the beams in the preferred embodiment of the present invention are channel beams which are open on at least one side, that torsional twisting or torqueing of the chassis is facilitated which is desirable where the vehicle is to be operated on uneven terrain.

Moreover, it will be appreciated that although the slotted reach beam 18 has been described as the rear reach beam with the channel piece 58 at the rear distal end 56 of the center beam 14, the front and rear reach beams and center beams may be reversed without departing from the spirit of the invention.

Finally, it will be also understood that the preferred embodiment of the invention which has been described is merely illustrative of the principles of the present invention. Numerous modifications may be made by those skilled in the art without departing from the true spirit and scope of the invention.

I claim:

1. A vehicle chassis which is adjustable between minimum and maximum lengths comprising:

first and second axle assemblies each having first and second axle beams, respectively, extending transversely of the chassis and adapted to have wheels mounted thereon;

first and second reach beams mounted on said first and second axle beams, respectively, and extending longitudinally from and substantially perpendicular to the respective axle beams and toward each other, each of said reach beams terminating in distal ends opposite their respective axle beams;

a center beam having opposite distal ends;

said first and second reach beams and said center beam being dimensioned relative to each other to telescopically interfit with each other such that the distal ends of said center beam are positioned adjacent said first and second axle beams, and the distal end of at least one of said reach beams is positioned adjacent the axle beam of the other reach beam when said chassis is at its minimum length; and locking means for locking said beams relative to each other when said chassis is at its minimum length.

2. The chassis of claim 1, wherein when the chassis is at its minimum length, said center beam is positioned within both of said reach beams, and one of said reach beams is positioned in the other reach beam.

3. The chassis of claim 1, wherein said first reach beam comprises side walls spaced from each other by a top wall, and said top wall comprises a slot extending over a substantial part of the longitudinal length of said first reach beam to permit fractional adjustment of the length of the chassis.

4. The chassis of claim 3, wherein when the chassis is at its minimum length, said center beam is positioned within at least one of said reach beams, and said second reach beam is positioned in said first reach beam.

5. The chassis of claim 4, wherein said center beam is positioned within both of said reach beams.

6. The chassis of claim 3, wherein said locking means includes a plate overlying said slot, and vertically extending first fastener means mounted adjacent one distal end of said center beam and extending upwardly through said slot and said plate and removably fastened to said plate.

7. The chassis of claim 6, wherein said locking means also includes vertically extending second fastener means mounted adjacent the other distal end of said center beam, and at least one opening in said second reach beam at least adjacent said second axle beam, said second fastener means extending upwardly through said opening and removably fastened to said second reach beam.

8. The chassis of claim 7, wherein said second reach beam also includes at least one opening adjacent its distal end, said second fastener means extending upwardly through the last mentioned opening and removably fastened to said second reach beam when the chassis is at its maximum length.

9. The chassis of claim 1, wherein said first reach beam is a hat channel in cross section, said second reach beam is a U-shaped channel in cross section and said center beam is a box channel in cross section having a slot in one side thereof.

10. The chassis of claim 9, wherein said first reach beam comprises side walls spaced from each other by a top wall, and said top wall comprises a slot extending over a substantial part of the longitudinal length of said first reach beam.

11. The chassis of claim 10, wherein when said chassis is at its minimum length, said center beam is positioned within at least one of said reach beams, and said second reach beam is positioned in said first reach beam.

12. The chassis of claim 11, wherein said center beam is positioned within both of said reach beams.

13. A vehicle chassis which is adjustable between minimum and maximum lengths comprising:

first and second axle assemblies each having first and second axle beams, respectively, extending transversely of the chassis and adapted to have wheels mounted thereon;

first and second reach beams mounted on said first and second axle beams, respectively, and extending longitudinally from and substantially perpendicular to the respective axle beams and toward each other, each of said reach beams terminating in distal ends opposite their respective axle beams;

a center beam having opposite distal said first and second reach beams and said center beam being dimensioned relative to each other to telescopically interfit with each other such that the distal ends of said center beam may be slidably positioned in said first and second reach beams to adjust the length of said chassis;

said first reach beam comprising side walls spaced from each other by a top wall, and said top wall comprising a slot extending over a substantial part of the longitudinal length of said first reach beam to permit fractional adjustment of the length of the chassis; and locking means for locking said beams relative to each other when the chassis has been adjusted to its desired length.

14. The chassis of claim 13, wherein when the chassis is at its minimum length, said center beam is positioned within both of said reach beams, and one of said reach beams is positioned in the other reach beam.

15. The chassis of claim 13, wherein when the chassis is at its minimum length, said center beam is positioned within at least one of said reach beams, and said second reach beam is positioned in said first reach beam.

16. The chassis of claim 13, wherein said locking means includes a plate overlying said slot, and vertically extending first fastener means mounted adjacent one distal end of said center beam and extending upwardly through said slot and said plate and removably fastened to said plate.

17. The chassis of claim 16, wherein said locking means also includes vertically extending second fastener means mounted adjacent the other distal end of said center beam, and at least one opening in said second reach beam at least adjacent said second axle beam, said second fastener means extending upwardly through said opening and removably fastened to said second reach beam.

18. The chassis of claim 17, wherein said second reach beam also includes at least one opening adjacent its distal end, said second fastener means extending upwardly through the last mentioned opening and removably fastened to said second reach beam when the chassis is at its maximum length.

19. The chassis of claim 1, wherein one of said reach beams is longer than the other of said reach beams.

20. The chassis of claim 2, wherein one of said reach beams is longer than the other of said reach beams.

21. The chassis of claim 4, wherein one of said reach beams is longer than the other of said reach beams.

22. The chassis of claim 11, wherein one of said reach beams is longer than the other of said reach beams.

23. The chassis of claim 13, wherein one of said reach beams is longer than the other of said reach beams.

24. The chassis of claim 14, wherein one of said reach beams is longer than the other of said reach beams.

25. The chassis of claim 15, wherein one of said reach beams is longer than the other of said reach beams.

26. The chassis of claim 1, wherein the sum of the lengths of said first and second reach beams is substantially greater than the length of said center beam.

27. The chassis of claim 13, wherein the sum of the lengths of said first and second reach beams is substantially greater than the length of said center beam.

* * * * *